(12) United States Patent
Bazan (10) Patent No.: US 10,006,456 B2
(45) Date of Patent: Jun. 26, 2018

(54) FULLY-DRAINING DIAPHRAGM PUMP AND CHECK VALVE ASSEMBLY

(71) Applicant: Alberto Bazan, Duluth, GA (US)

(72) Inventor: Alberto Bazan, Duluth, GA (US)

(73) Assignee: Murzan, Inc., Norcross, GA (US)

( * ) Notice: Subject to any disclaimer, the term of this patent is extended or adjusted under 35 U.S.C. 154(b) by 384 days.

(21) Appl. No.: 14/450,009

(22) Filed: Aug. 1, 2014

(65) Prior Publication Data

US 2016/0032919 A1 Feb. 4, 2016

(51) Int. Cl.
| | |
|---|---|
| *F04B 53/10* | (2006.01) |
| *F04B 43/02* | (2006.01) |
| *F04B 53/04* | (2006.01) |
| *F04B 43/00* | (2006.01) |
| *F16K 15/02* | (2006.01) |

(52) U.S. Cl.
CPC .......... *F04B 53/10* (2013.01); *F04B 43/0054* (2013.01); *F04B 43/02* (2013.01); *F04B 53/04* (2013.01); *F16K 15/021* (2013.01); *Y10T 137/792* (2015.04); *Y10T 137/7909* (2015.04); *Y10T 137/7915* (2015.04)

(58) Field of Classification Search
CPC .................. F04B 53/10; F04B 43/0054; F04B 43/02–43/0736; F04B 53/04; Y10T 137/7909; Y10T 137/7915; Y10T 137/792; Y10T 137/3021–137/308; Y10T 137/7837–137/7939; F16K 15/021; F16K 15/06; F16K 15/023; F16K 15/028
See application file for complete search history.

(56) References Cited

U.S. PATENT DOCUMENTS

| | | | | |
|---|---|---|---|---|
| 1,093,465 | A * | 4/1914 | Otis ...................... | F24D 19/081 137/176 |
| 1,608,424 | A * | 11/1926 | Putnam ................. | F16K 15/063 137/533.21 |
| 2,187,487 | A * | 1/1940 | Burt ...................... | E21B 33/134 137/527.6 |
| 3,338,171 | A * | 8/1967 | Conklin ................. | F01L 23/00 417/339 |

(Continued)

OTHER PUBLICATIONS

International Searching Authority, International Search Report for PCT/US15/43092 dated Dec. 28, 2015, 1pg.

(Continued)

*Primary Examiner* — Peter J Bertheaud
*Assistant Examiner* — Dnyanesh Kasture
(74) *Attorney, Agent, or Firm* — Duane Morris LLP (57) ABSTRACT

A fully-draining check valve with a mushroom assembly having a tapered back edge and a drain line disposed with the lower rim of the drain line below the tapered back edge to ensure no fluid becomes trapped in the check valve when not in use. Additionally, a fully-draining diaphragm pump is disclosed having a drain line configured to drain the lowest point of a product chamber to ensure no fluid becomes trapped in the diaphragm pump when not in use. A method of cleaning a fully-draining diaphragm pump and fully-draining check valve assembly is further disclosed comprising inducing turbulent flow of water, wash solution, and/or sanitizer through the assembly and opening ball valves the drain lines of the fully-draining check valves to vent the assembly.

20 Claims, 11 Drawing Sheets

(56) References Cited

U.S. PATENT DOCUMENTS

| | | | |
|---|---|---|---|
| 3,897,042 A * | 7/1975 | Kachergis | F16K 31/26 137/533.21 |
| 4,008,012 A | 2/1977 | Page | |
| 4,354,931 A * | 10/1982 | Allori | B01D 35/147 137/535 |
| 4,521,925 A * | 6/1985 | Chen | B64D 11/02 4/321 |
| 4,597,721 A | 7/1986 | Santefort | |
| 5,608,920 A | 3/1997 | Oliver et al. | |
| 5,957,670 A | 9/1999 | Duncan et al. | |
| 6,415,810 B2 * | 7/2002 | Matsuura | F16L 55/043 137/218 |
| 7,063,516 B2 | 6/2006 | Bethel | |
| 2005/0249621 A1 * | 11/2005 | Bethel | F04B 43/0736 417/559 |
| 2008/0099084 A1 | 5/2008 | Headley et al. | |
| 2013/0078125 A1 | 3/2013 | Headley et al. | |

OTHER PUBLICATIONS

International Bureau, International Preliminary Report on Patentability for corresponding international application PCT/USI5/43092 dated Feb. 7, 2017.

* cited by examiner

FULLY-DRAINING DIAPHRAGM PUMP AND CHECK VALVE ASSEMBLY

FIELD OF THE INVENTION

The present disclosure generally relates to systems for moving fluid products. More specifically, the present disclosure is directed to an apparatus, system, and method of cleaning and draining a diaphragm pump and check valve assembly which is used to move fluid products.

BACKGROUND

Diaphragm pumps are used to provide motive force to consumer products in a fluid state such as some foods, beverages, pharmaceuticals, cosmetics, and the like. Diaphragm pumps provide several advantages over rotary or centrifugal pumps, namely strong suction, the ability to move highly-viscous fluids or fluids with suspended particulates, and the ability to move fragile or delicate products. Since it is generally desirable to sequentially use a single diaphragm pump for more than one fluid product, the pump and associated systems must be cleaned prior to introducing each new product into the system to prevent product mixing. For example, if a diaphragm pump is used to move a shampoo product, it must be cleaned after completion of the shampoo movement and before subsequent use to move a conditioner product so that residual shampoo in the pump does not mix with the conditioner.

Cleaning of the diaphragm pump and associated systems presents several problems. First, cleaning is often time- and labor-intensive, as personnel with knowledge of the pump and system are generally required to break apart various components to clean them. Second, it is desirable—but difficult—to perform the cleaning in a manner that ensures sufficiently thorough cleaning. For some consumer products, even a small amount of mixing with a prior-introduced product would render the latter-introduced product unusable. Third, and perhaps most importantly, the cleaning steps generally use water to remove fluid products from the pump and system, and this water can become trapped in low points in the pump and system. Trapped cleaning water then either mixes with the latter-introduced product or, worse, creates an environment which is ripe for bacterial growth.

SUMMARY

It is thus an object of the present disclosure to present an apparatus, systems, and methods to overcome the deficiencies in the prior art discussed above. In some embodiments, a fully-draining diaphragm pump and check valve system comprises a sealed diaphragm pump having a first product chamber on a first side of the pump and a second product chamber on a second side of the pump, which takes suction from a suction manifold and discharges to a discharge manifold; a first check valve disposed between the suction manifold and first product chamber; a second check valve disposed between the suction manifold and the second product chamber; a third check valve disposed between the first product chamber and the discharge manifold; a fourth check valve disposed between the second product chamber and the discharge manifold, wherein each of the first, second, third, and fourth check valves comprises a mushroom assembly having a stem and valve disc, the valve disc having a tapered back edge and each of the first, second, third, and fourth check valves having a drain line disposed with a lower rim of the drain line below the tapered back edge of the respective valve disc. Each of the valve discs may have a substantially hemispheric valve front edge. Each of the first, second, third, and fourth check valves may further comprise a valve body, comprising a disc seat and a valve housing having an inlet plenum and outlet plenum, wherein the mushroom assembly is disposed within the valve body and biased to seal against the disc seat until a predetermined pressure is achieved in the inlet plenum or a predetermined suction is achieved in the outlet plenum.

Additionally, each of the first, second, third, and fourth check valves may further comprise a mushroom assembly guide configured to guide the movement of the mushroom assembly when the mushroom assembly moves between open and shut positions. The system may include a ball valve connected to the drain line of each of the first, second, third, and fourth check valves. The diaphragm pump may include a drain line at a low point of the first and second product chambers. The drain lines from each product chamber may drain to a respective portion of manifold piping.

In some embodiments, a fully-draining check valve comprises a valve body, comprising a disc seat and a valve housing having an inlet plenum and outlet plenum; a mushroom assembly, comprising a stem and valve disc, disposed within the valve body and configured to seal against the disc seat until a predetermined pressure is achieved in the inlet plenum or a predetermined suction is achieved in the outlet plenum; a drain line, operably connected to the valve body such that a lower rim of the drain line is disposed below the back edge of the substantially hemispheric valve disc; and wherein the valve disc has a substantially hemispheric front edge and a back edge with substantially all of the back edge tapered toward the drain line. The fully-draining check valve may further comprise a ball valve connected to the drain line or a tri-clamp disposed across the outlet plenum of the valve body. The fully-draining check valve may further comprise a mushroom assembly guide configured to guide the movement of the mushroom assembly when the mushroom assembly moves between open and shut positions.

In some embodiments, a method for cleaning a diaphragm pump and check valve assembly comprises operating a centrifugal pump attached to a suction manifold of the diaphragm pump while taking suction sequentially for a predetermined period of time from a water source, a wash solution source, and a sanitizer source, said centrifugal pump operating at sufficient pressure to create turbulent flow of the water, wash solution, and sanitizer through the diaphragm pump and check valve assembly; cycling open and shut, while continuing to operate the centrifugal pump while taking suction sequentially for a predetermined period of time from a water source, a wash solution source, and a sanitizer source, a ball valve in a drain line of each check valve in the check valve assembly to flush the check valve and drain line; venting the diaphragm pump and check valve assembly to atmosphere by opening the ball valve in the drain line of each check valve to dry the assembly. The method may include securing the centrifugal pump during the period in which the ball valves are actively opening or shutting. The method may include maintaining the ball valve open for a predetermined period of time during the cycling step. The wash solution may comprise a mixture of soap and water. The sanitizer may comprise a chlorine-based solution. The method may be performed by a programmed processor of a computer in control of the centrifugal pump and ball valves, and may require no incremental action by a human once the process is initiated at the programmed processor of a computer. The method may include admitting compressed gas from a gas source into the diaphragm pump and check valve assembly to dry the assembly. The compressed gas may be one of air or an inert gas.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

The present disclosure is directed to a fully-draining check valve, a fully-draining diaphragm pump, a fully-draining diaphragm pump and check valve assembly, and methods of cleaning the same. The components and systems disclosed herein drain fully through the use of tapered valve disc surfaces, drain lines operably connected to the check valve body, and drain lines operably connected to the lowest point of a diaphragm pump product chamber. Fully draining the components and systems disclosed herein ensures that fluids cannot become trapped in the component or system which could cause undesirable fluid product mixing or bacteria growth.

Figure 1A:
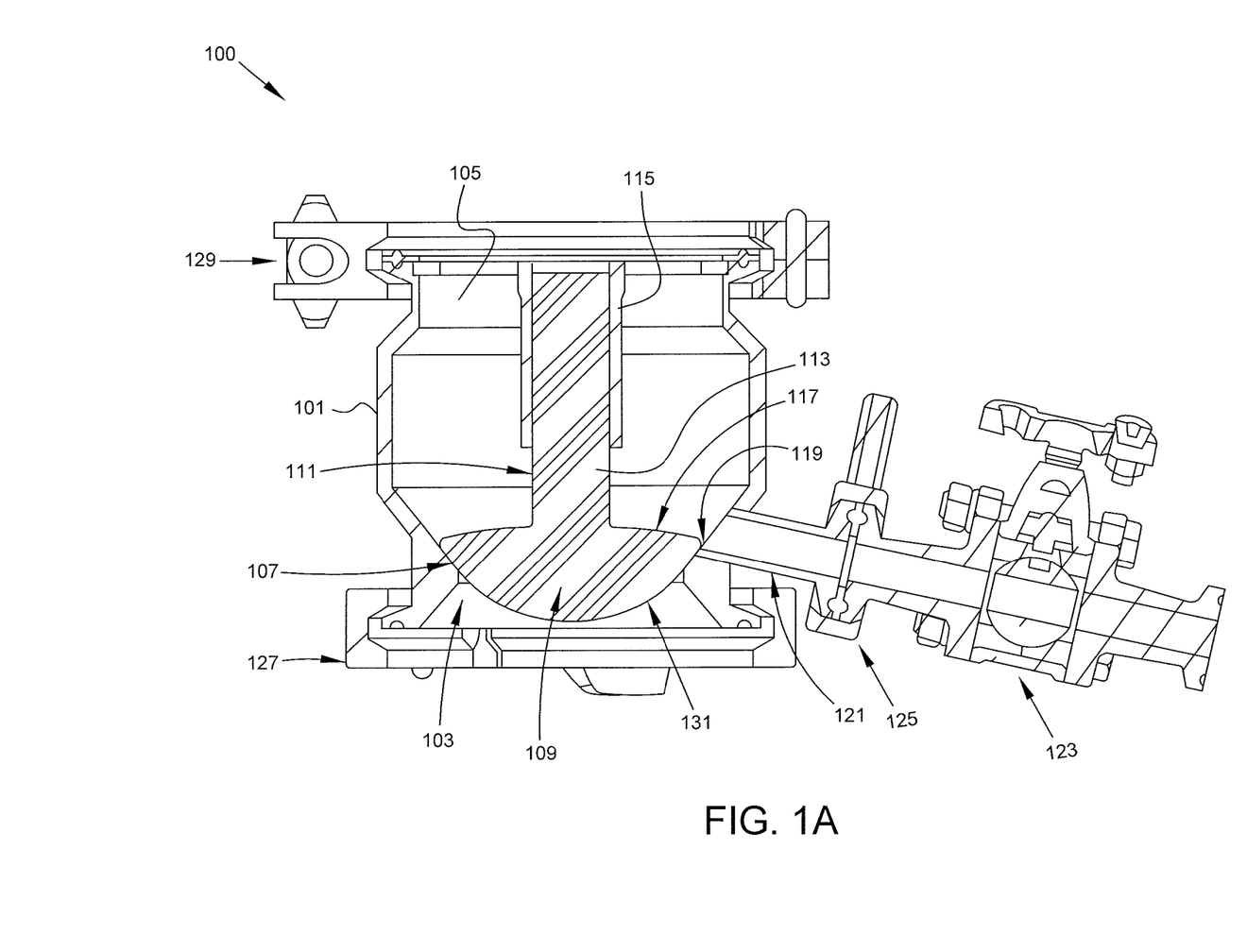
FIG. 1A is a cutaway view schematic diagram of a fully-draining check valve in accordance with some embodiments of the present disclosure.
Figure 1B:
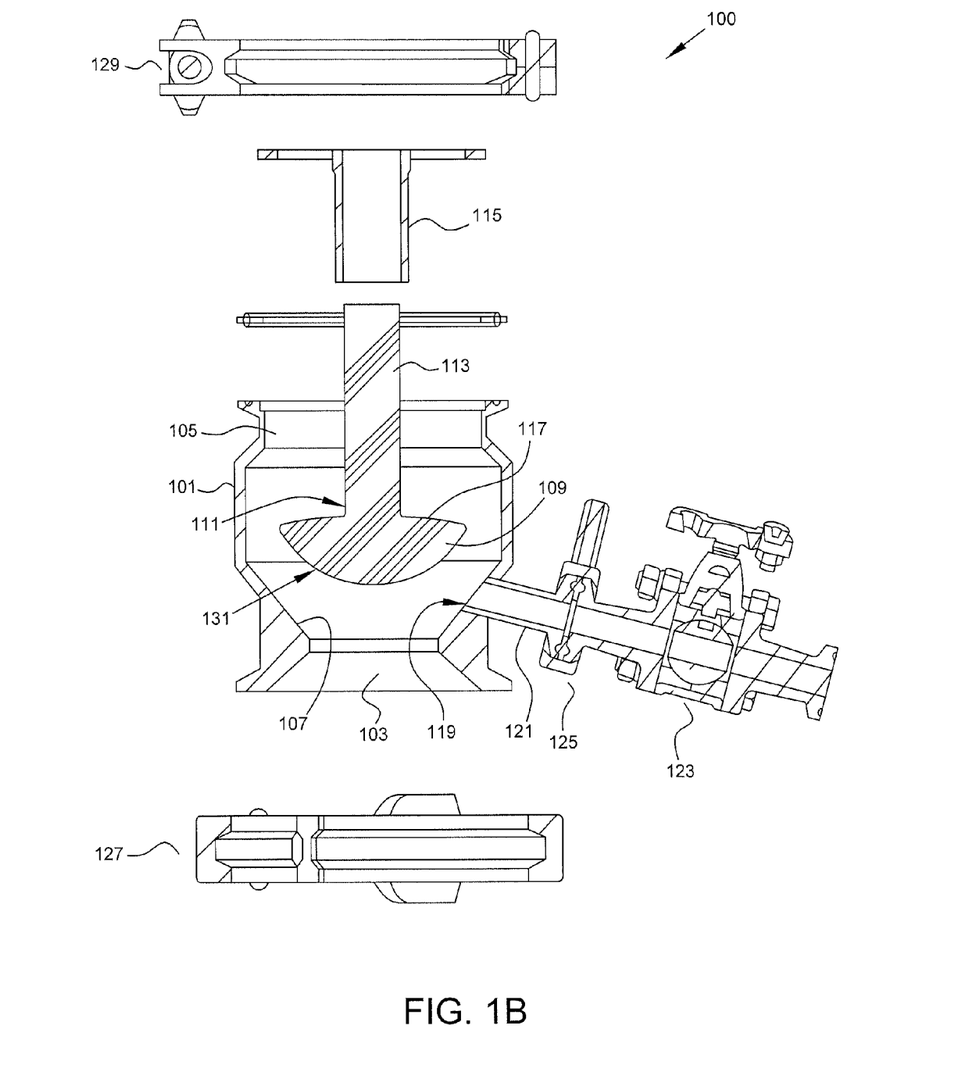
FIG. 1B is an exploded cutaway view schematic diagram of a fully-draining check valve in accordance with some embodiments of the present disclosure.

FIG. 1A is a cutaway view schematic diagram of a fully-draining check valve 100. FIG. 1B is an exploded cutaway view schematic diagram of the same fully-draining check valve 100.

The check valve 100 comprises a valve body 101, mushroom assembly 111, and drain line 121. The valve body 101 has an inlet plenum 103, outlet plenum 105, and valve seat 107 which is configured at an angle to receive the mushroom assembly 111 when the check valve 100 is in a shut position, forming a seal which prevents fluid flow in a direction from the outlet plenum 105 to the inlet plenum 103.

Mushroom assembly 111 comprises a valve stem 113 and a valve disc 109. In some embodiments, the valve disc 109 includes front edge 131 which is substantially hemispheric in shape. In some embodiments, valve disc 109 has a tapered back edge 117, wherein substantially all of the back edge 117 is tapered and the valve disc 109 is configured such that the back edge 117 is higher near the valve stem 113 and lower on the side engaged with the valve seat 107. Mushroom assembly 111 is disposed within the valve body 101 with valve stem 113 disposed within a mushroom assembly guide 115.

Drain line 121 is connected to the valve body 101 adjacent to valve seat 107. Drain line 121 is configured such that the lower rim 119 of drain line 121 is disposed below the tapered back edge 117 of the valve disc 109 when the valve disc is in the closed position. In this configuration, when the check valve 100 is in a shut position the drain line 121 is the lowest point in the check valve 100, so that fluid in the valve body 101 flows down tapered back edge 117 and into drain line 121.

Check valve 100 is operably connected to other systems using an inlet-side connector 127 and outlet-side connector 129. In some embodiments, inlet- and outlet-side connectors 127, 129 are tri-clamp fittings.

In some embodiments, drain line 121 is operably connected to a ball valve 123 via a drain line connector 125. In some embodiments, drain line connector 125 is a tri-clamp fitting.

In some embodiments, it is desirable to have check valve 100 biased in certain directions using a spring or other biasing means. For example, in some embodiments a spring is disposed in the mushroom assembly guide 115 to provide biasing of the mushroom assembly 111 in the valve shut direction.

In operation, mushroom assembly 111 rests against valve seat 107, forming a seal which prevents fluid flow in a direction from the outlet plenum 105 toward the inlet plenum 103. When sufficient pressure in the inlet plenum 103 or sufficient suction in the outlet plenum 105 overcomes the force with which the mushroom assembly 111 rests against valve seat 107, the mushroom assembly 111 is raised, breaking the seal and permitting fluid flow in a direction from the inlet plenum 103 and toward the outlet plenum 105.

In some embodiments, as shown in FIGS. 1A and 1B, gravity is the motive force for the mushroom assembly 111, which is to say that gravity maintains the mushroom assembly 111 in a shut position unless there is sufficient pressure in the inlet plenum 103 or sufficient suction in the outlet plenum 105 to overcome the force of gravity and move the mushroom assembly 111 into an open position. Where gravity is the motive force for the mushroom assembly 111, the check valve 100 must be installed vertically—an orientation in which the valve disc 109 is configured below the valve stem 113—or else the check valve 100 will be rendered inoperable.

In other embodiments, a spring (not shown) or other motive force is provided in the mushroom assembly guide 115 which exerts force on the mushroom assembly 111 and holds it shut unless there is sufficient pressure in the inlet plenum 103 or sufficient suction in the outlet plenum 105 to overcome the force of the spring or other motive force and move the mushroom assembly 111 into an open position. Where motive force other than gravity is provided, the check valve 100 can be installed in various orientations (i.e., not vertically alone), but the drain line 121, drain line connector 125, and ball valve 123 must be reconfigured to ensure gravity draining of the check valve 100.

With check valve 100 in an open position, fluid flows from the inlet plenum 103 towards and through the outlet plenum 105. With check valve 100 in a shut position, fluid is prevented from flowing from the outlet plenum 105 towards or through the inlet plenum 103. Additionally, with the check valve 100 in the shut position, fluid in the check valve 100 will naturally flow by force of gravity into the drain line 121 which is the lowest point in the vertically-oriented check valve 100. As will be discussed below, this configuration with the lower rim 119 of drain line 121 below the tapered back edge 117 of the valve disc 109 is essential to the proper draining, cleaning, and sanitizing of the check valve 100.

Figure 4A:
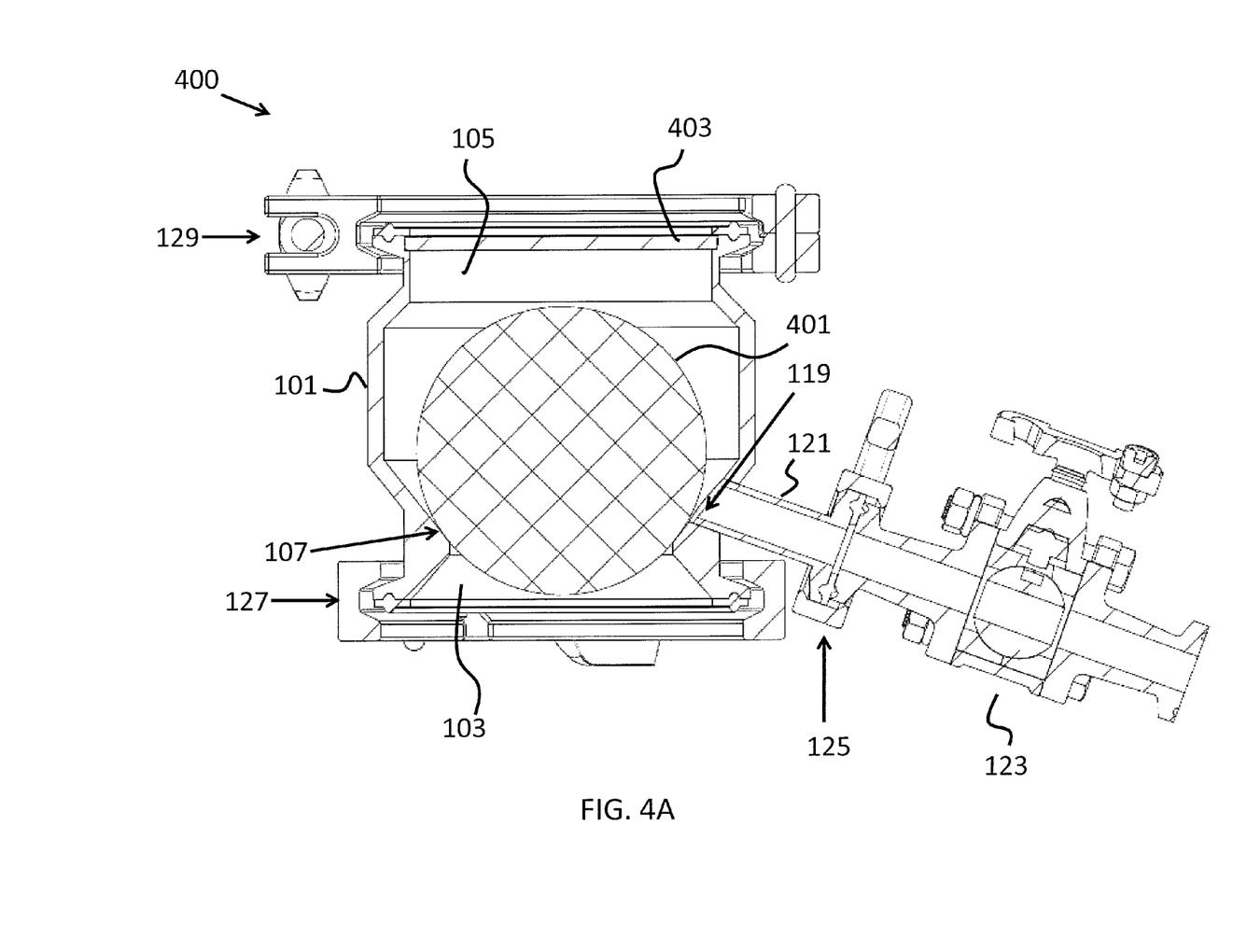
FIG. 4A is a cutaway view schematic diagram of a fully-draining check valve in accordance with some embodiments of the present disclosure.
Figure 4B:
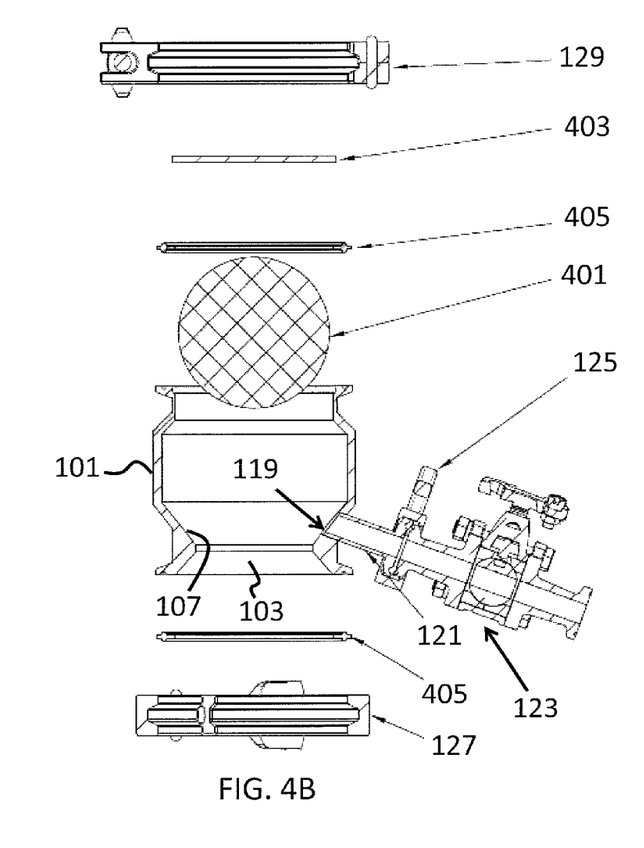
FIG. 4B is an exploded cutaway view schematic diagram of a fully-draining check valve in accordance with some embodiments of the present disclosure.

In some embodiments, the mushroom assembly 111 of fully-draining check valve 100 is replaced with a ball assembly to form a fully-draining ball check valve 400 as illustrated in FIGS. 4A and 4B. FIG. 4A is a cutaway view schematic diagram of a fully-draining check valve 400. FIG. 4B is an exploded cutaway view schematic diagram of the same fully-draining check valve 400.

As with fully-draining check valve 100, fully-draining check valve 400 comprises a valve body 101 and drain line 121. In place of mushroom assembly 111 is ball 401, which is configured to form a seal against valve seat 107 which prevents fluid flow in a direction from the outlet plenum 105 to the inlet plenum 103 when fully-draining check valve 400 is shut. As with mushroom assembly 111, gravity is the motive force for ball 401, which is to say that gravity maintains ball 401 in a shut position unless there is sufficient pressure in the inlet plenum 103 or sufficient suction in the outlet plenum 105 to overcome the force of gravity and move ball 401 into an open position. Where gravity is the motive force for ball 401, the check valve 100 must be installed vertically or else the check valve 100 will be rendered inoperable. A ball stop 403 is disposed above ball 401 and configured to prevent ball 401 from exiting valve body 101 or fully blocking outlet plenum 105.

Again, as with fully-draining check valve 100, for fully-draining check valve 400 the drain line 121 is connected to the valve body 101 adjacent to valve seat 107. Drain line 121 is configured such that the lower rim 119 of drain line 121 is the lowest point in the check valve 400 when in the closed position, so that fluid in the valve body 101 flows into drain line 121 when check valve 400 is shut.

Fully-draining check valve 400 is operably connected to other systems using an inlet-side connector 127 and outlet-side connector 129. In some embodiments, inlet- and outlet-side connectors 127, 129 are tri-clamp fittings. In some embodiments, inlet- and outlet-side connectors 127, 129 include gaskets 405.

Figure 2:
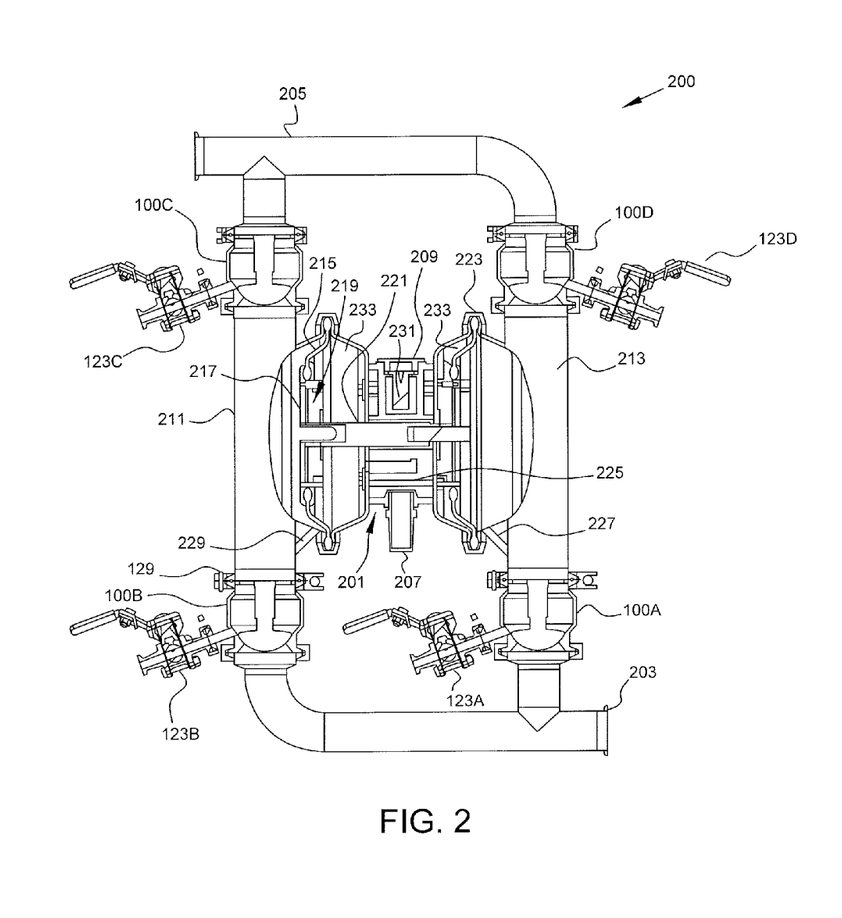
FIG. 2 is a cutaway view schematic diagram of a fully-draining diaphragm pump and check valve assembly in accordance with some embodiments of the present disclosure.

FIG. 2 is a cutaway view schematic diagram of a fully-draining diaphragm pump and check valve assembly 200. The assembly 200 comprises a diaphragm pump 201 operably connected to a suction manifold 203 and discharge manifold 205. In some embodiments, diaphragm pump 201 is a sealed, pneumatic diaphragm pump. Diaphragm pump 201 comprises an air inlet 209, diaphragm 215, outer piston 217, inner piston 219, shaft 221, centerblock 225, and exhaust muffler 207.

The fully draining diaphragm pump and check valve assembly 200 includes four fully-draining check valves 100A-D. A check valve 100 is operably connected between each product chamber 211, 213 and each of the suction manifold 203 and discharge manifold 205. Each check valve 100 comprises a mushroom assembly with a tapered back edge of the valve disc and a drain line with the lower rim of drain line disposed below the tapered back edge of the valve disc. Each drain line is operably connected to a ball valve 123A-D which normally remain shut during pumping operations of the diaphragm pump and check valve assembly 200.

The fully draining diaphragm pump and check valve assembly 200 additionally includes a product chamber drain line 227, 229 for each product chamber 211, 213. The product chamber drain lines 227, 229 are disposed at a low point in the product chamber 211, 213 adjacent to the diaphragm 215 to ensure that the product chamber 211, 213 will fully drain when the diaphragm pump 201 is not in operation.

In some embodiments, suction manifold 203 is replaced with two separate sections of suction pipe such that diaphragm pump 201 is able to take suction from two separate sources or from two separate suction pipes connected to the same source. When taking suction off two separate sources, suction piping operably connected to fully draining check valve 100A and product chamber 213 draws from a first source while suction piping operably connected to fully draining check valve 100B and product chamber 211 draws from a second source.

Similarly, in some embodiments discharge manifold 205 is replaced with two separate sections of discharge pipe such that diaphragm pump 201 is able to discharge to two separate areas or two two separate discharge pipes connected to the same area. When discharging to two separate areas, discharge piping operably connected to fully draining check valve 100D and product chamber 213 discharges to a first area while discharge piping operably connected to fully draining check valve 100C and product chamber 211 discharges to a second area.

Thus, in some embodiments diaphragm pump 201 is configured to take suction from two separate sources and discharge to two separate areas. A first product is pumped from a first source through fully-draining check valve 100A, product chamber 213, and fully-draining check valve 100D to a first area. A second product is pumped from a second source through fully-draining check valve 100B, product chamber 211, and fully-draining check valve 100C to a second area.

In operation, compressed air serves as the motive force in diaphragm pump 201. Air is introduced into the centerblock 225 via air inlet 209, and is directed via a mechanical air valve 231 to either of a pair of air chambers 233. As air enters an air chamber 233, it pushes against inner piston 219 and the air chamber side of diaphragm 215. The air chamber 233 expands toward the respective product chamber 211, 213, and the outer piston 217 and diaphragm 215 move outwardly and are guided by shaft 221. The expanding air chamber 233 displaces fluid in the respective product chamber 211, 213, which pressurizes the fluid. The pressurized fluid cannot flow towards the suction manifold 203 as a result of check valves 100A or 100B. Instead, the pressurized fluid flows through check valves 100C or 100D and into the discharge manifold 205.

As one of the pair of air chambers 233 is expanding, the other air chamber is contracting. This contracting motion creates a suction stroke of the diaphragm pump 201, which draws fluid up from the suction manifold 203, through check valve 100A or 100B, and into the respective product chamber 211, 213. When the expanding air chamber 233 reaches a predetermined volume of expansion, the inner piston 219 will trip an actuator (not shown) on the mechanical air valve 231, which switches the air chamber 233 to which incoming air is directed. With air directed to the opposite air chamber 233, the previously-expanding air chamber now begins to contract and the previously-contracting air chamber now begins to expand. Thus as the inner piston 219 and outer piston 217 are continuously in motion due to the expanding and contracting motions of the air chambers 233 and diaphragms 215, fluid in the suction manifold 203 is continuously pulled into one of the product chambers 211, 213 and then pushed into the discharge manifold 205.

Figure 3:
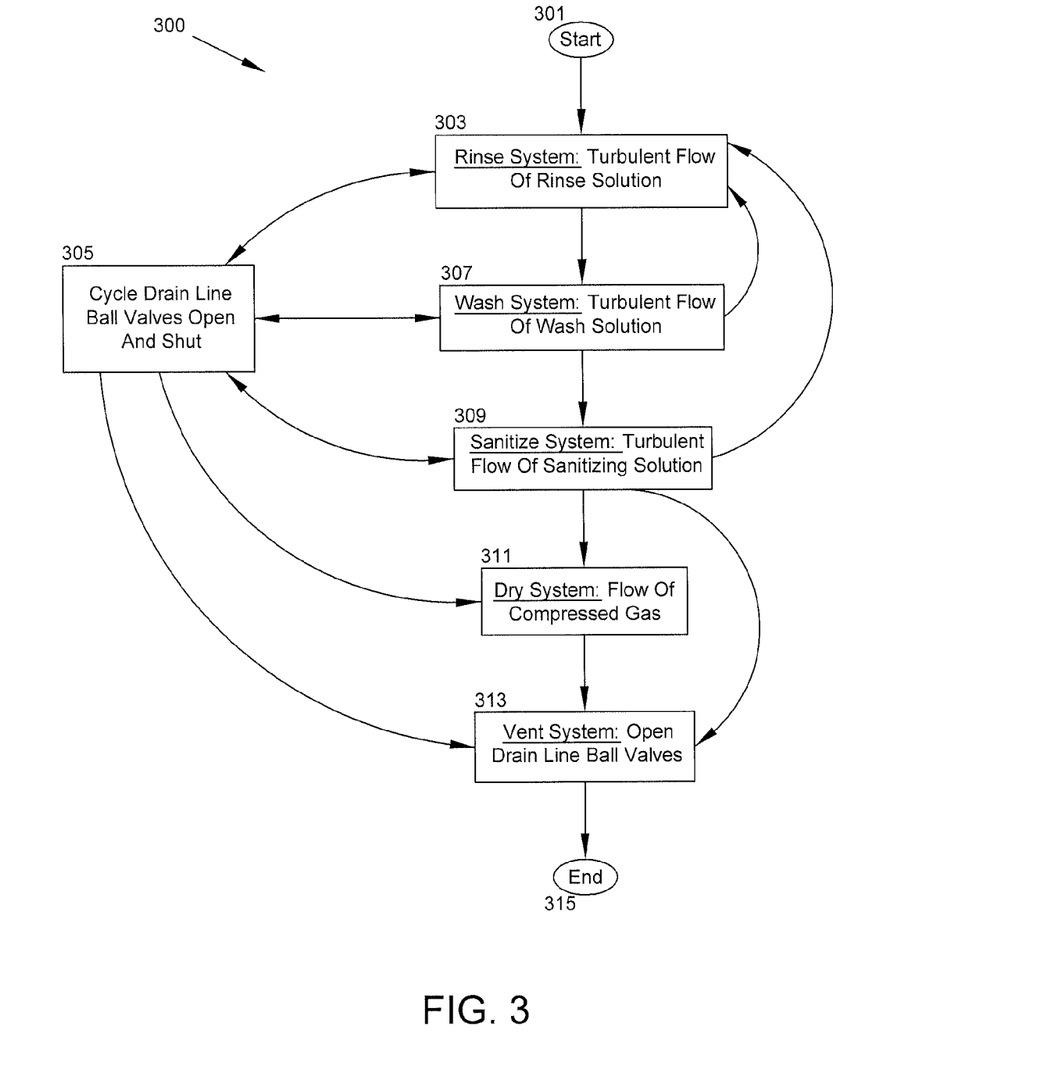
FIG. 3 is a flow diagram of a method for cleaning a fully-draining diaphragm pump and check valve assembly in accordance with some embodiments of the present disclosure.

FIG. 3 is a flow diagram of a method 300 for cleaning a fully-draining diaphragm pump and check valve assembly 200. The flow diagram of FIG. 3 illustrates numerous embodiments of method 300.

Method 300 begins at block 301. At block 303, the assembly 200 is rinsed by introducing turbulent flow of a rinse solution. In some embodiments, the rinse solution is water. In other embodiments, the rinse solution is water with a mild detergent or soap.

In some embodiments, the method 300 proceeds from block 303 to block 305, where the drain line ball valves 123A-D are cycled open and shut while turbulent flow of the rinse solution is maintained. In some embodiments, cycling open and shut includes maintaining the drain line ball valves 123A-D open for a predetermined period of time. In some embodiments, it is necessary to secure turbulent flow of the rinse solution during operation (i.e., while opening and shutting) of the drain line ball valves 123A-D and then re-commence turbulent flow once the drain line ball valves 123A-D are in the appropriate or desired position. In some embodiments, the drain line ball valves 123A-D are cycled with turbulent flow of rinse solution secured and the assembly 200 is gravity drained.

In some embodiments, it is not desired to perform the cycling of block 305 while rinsing the system with a rinse solution and the method 300 proceeds directly from block 303 to block 307. In other embodiments, the method 300 proceeds to block 307 following the cycling of block 305.

At block 307, the assembly 200 is washed by introducing turbulent flow of a wash solution. In some embodiments, a wash solution is a mixture of water and soap or detergent.

In some embodiments, the method 300 proceeds from block 307 to block 305, where the drain line ball valves 123A-D are cycled open and shut while turbulent flow of the wash solution is maintained. In some embodiments, cycling open and shut includes maintaining the drain line ball valves 123A-D open for a predetermined period of time. In some embodiments, it is necessary to secure turbulent flow of the wash solution during operation (i.e., while opening and shutting) of the drain line ball valves 123A-D and then re-commence turbulent flow once the drain line ball valves 123A-D are in the appropriate or desired position. In some embodiments, the drain line ball valves 123A-D are cycled with turbulent flow of wash solution secured and the assembly 200 is gravity drained.

In some embodiments, it is not desired to perform the cycling of block 305 while washing the system with a wash solution and the method 300 proceeds directly from block 307 to block 309. In other embodiments, the method 300 proceeds to block 309 following the cycling of block 305.

At block 309, the assembly 200 is sanitized by introducing turbulent flow of a sanitizing solution. In some embodiments, a sanitizing solution is a chlorine-based solution, such as a mixture of chlorine and water.

In some embodiments, the method 300 proceeds from block 309 to block 305, where the drain line ball valves 123A-D are cycled open and shut while turbulent flow of the sanitizing solution is maintained. In some embodiments, cycling open and shut includes maintaining the drain line ball valves 123A-D open for a predetermined period of time. In some embodiments, it is necessary to secure turbulent flow of the sanitizing solution during operation (i.e., while opening and shutting) of the drain line ball valves 123A-D and then re-commence turbulent flow once the drain line ball valves 123A-D are in the appropriate or desired position. In some embodiments, the drain line ball valves 123A-D are cycled with turbulent flow of sanitizing solution secured and the assembly 200 is gravity drained.

In some embodiments, it is not desired to perform the cycling of block 305 while sanitizing the system with a sanitizing solution and the method 300 proceeds directly from block 309 to either block 311 or block 313. In other embodiments, the method 300 proceeds to either block 311 or block 313 following the cycling of block 305.

As is further illustrated in FIG. 3, the steps of rinsing, washing, and sanitizing of blocks 303, 307, and 309, respectively, can be performed in numerous combinations and iterations. For example, a cleaning method 300 may comprise the steps of first rinse, wash, sanitize, and second rinse.

Blocks 311 and block 313 present various methods to dry the assembly 200. Method 300 can include blocks 311 and 313 alone or in combination. At block 311, a compressed gas is introduced into the assembly 200. In some embodiments, the compressed gas is compressed air or a compressed noble gas. The introduction of compressed gas into the assembly 200 at block 311 may assist in removing fluids from the assembly 200. At block 313, the drain line ball valves 123A-D are opened and the assembly is vented to the surrounding atmosphere to aid in drying.

In some embodiments, turbulent flow is established for method 300 using a centrifugal pump connected to a source containing a rinse solution, wash solution, or sanitizing solution. In other embodiments, turbulent flow is established for method 300 by operating the diaphragm pump while taking suction from a source containing a rinse solution, wash solution, or sanitizing solution.

Additionally, the diaphragm pump 201 can be operated during any one or all of the steps of method 300 to aid in the cleaning process.

Figure 5A:
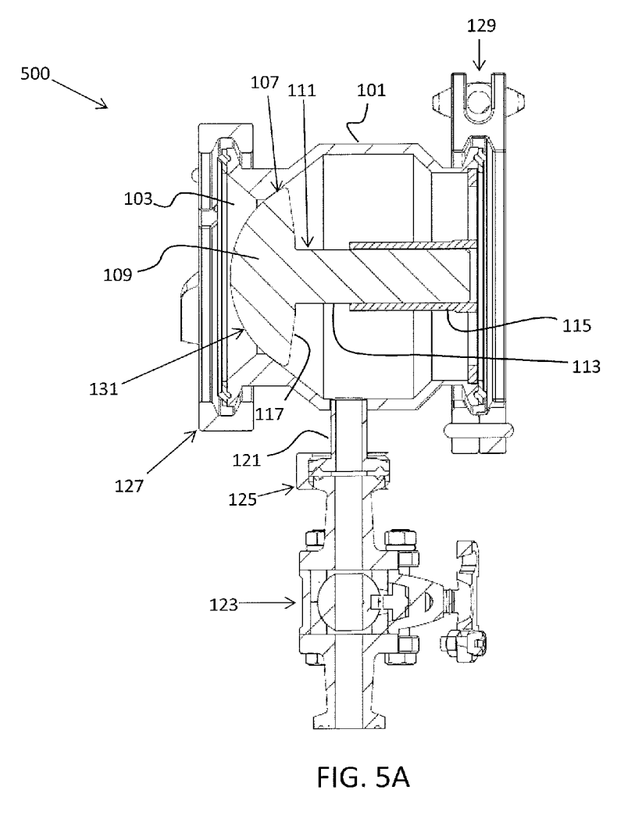
FIG. 5A is a cutaway view schematic diagram of a horizontally-oriented fully-draining check valve in accordance with some embodiments of the present disclosure.
Figure 5B:
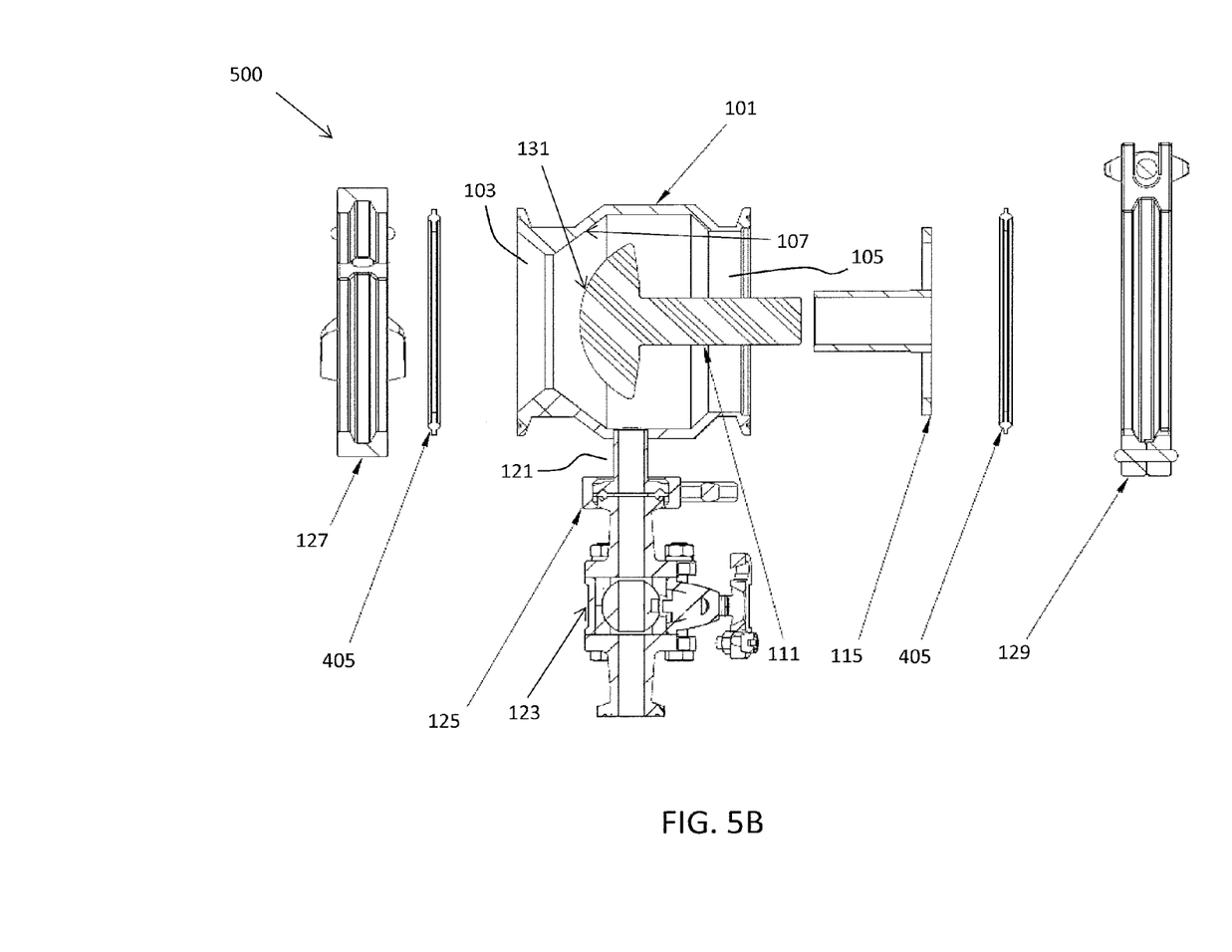
FIG. 5B is an exploded cutaway view schematic diagram of a horizontally-oriented fully-draining check valve in accordance with some embodiments of the present disclosure.

As described above, in some embodiments a fully-draining check valve is installed in a non-vertical position. FIGS. 5A and 5B illustrate cutaway views of a horizontally-oriented fully-draining check valve 500 in accordance with some embodiments. Drain line 121 is disposed at the lowest point of body 101, such that fluid in the valve body 101 flows into drain line 121 when check valve 500 is shut.

In some embodiments, a spring (not shown) is disposed within the mushroom assembly guide 115 to provide a motive force to shut check valve 500.

In some embodiments, mushroom assembly 111 is replaced with a ball, as in FIGS. 4A and 4B. For such embodiments to be horizontally oriented, valve body 101 is angled at a sufficient slope such that the ball, under force of gravity, re-seats against valve seat 107 when flow stops or reverses.

In some embodiments, mushroom assembly 111 is replaced with a flapper assembly which is shut by re-seating against valve seat 107 under the force of gravity when flow stops or reverses.

Figure 6A:
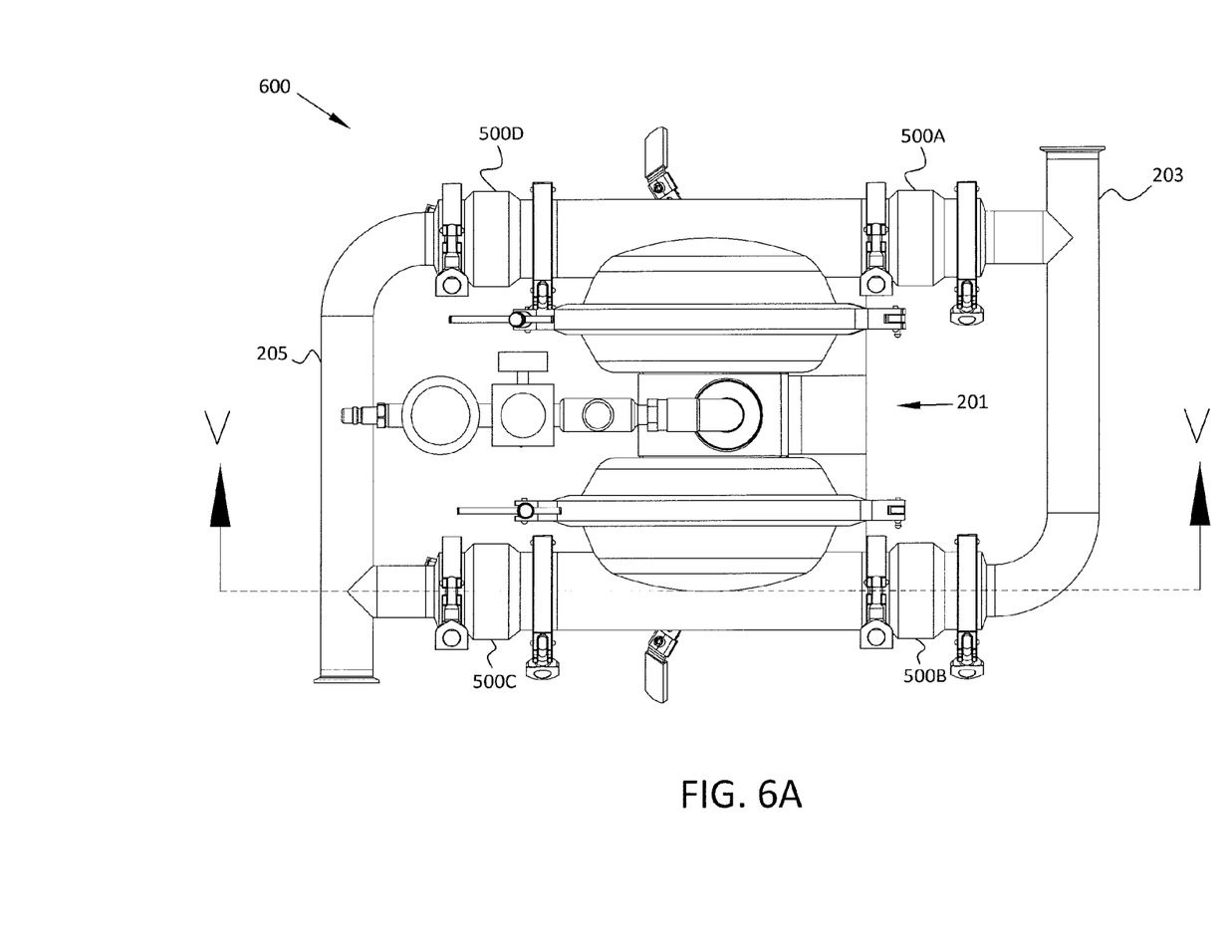
FIG. 6A is a top profile view of a horizontally-oriented fully-draining diaphragm pump and check valve assembly in accordance with some embodiments of the present disclosure.
Figure 6B:
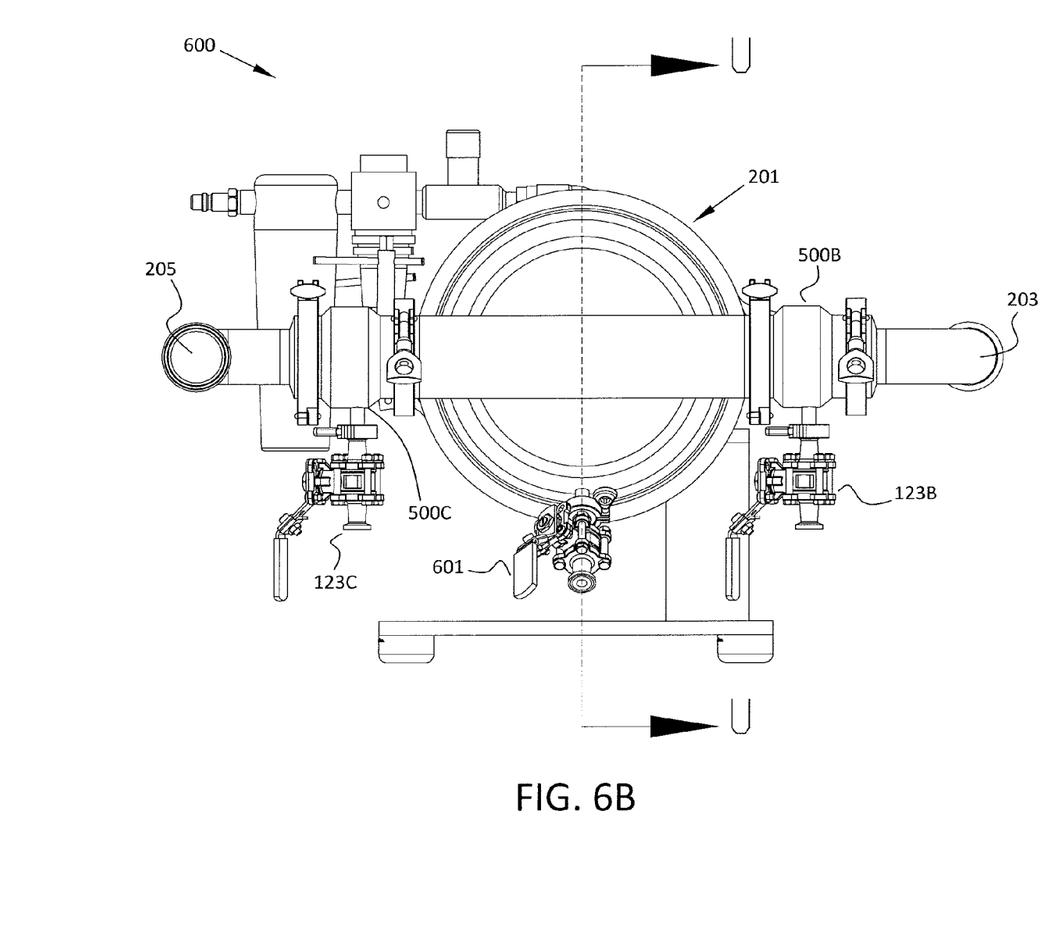
FIG. 6B is a side profile view of a horizontally-oriented fully-draining diaphragm pump and check valve assembly in accordance with some embodiments of the present disclosure.
Figure 6C:
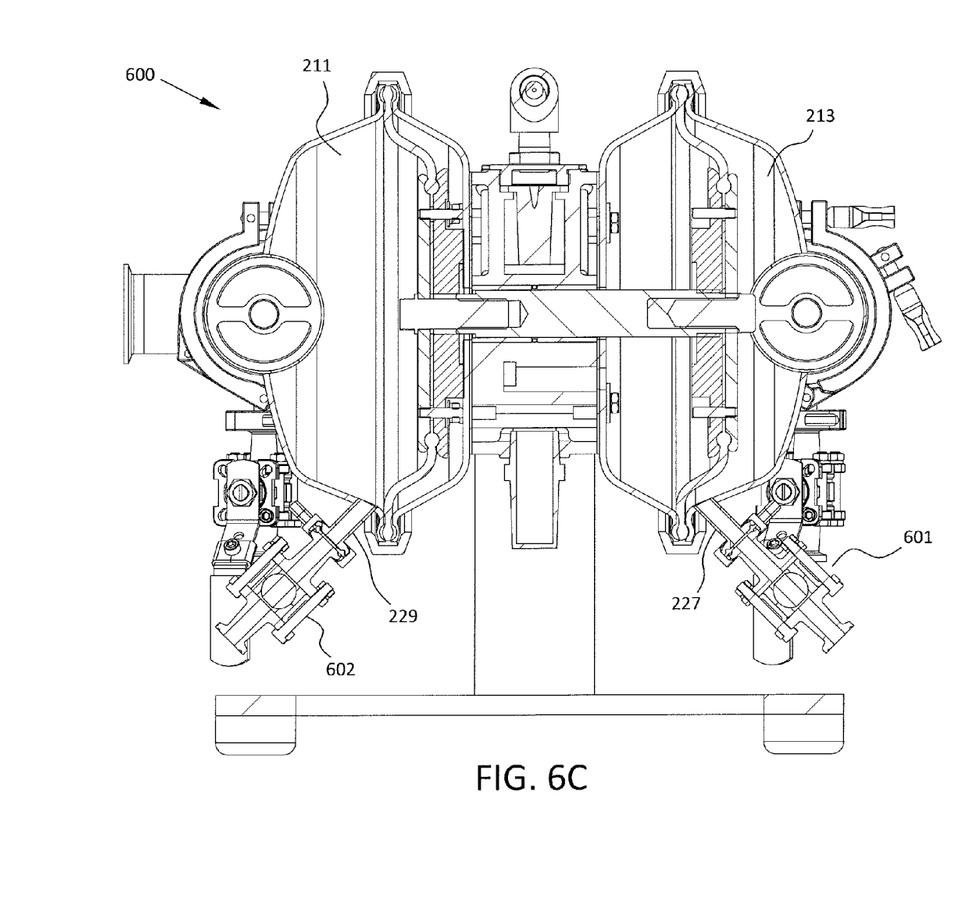
FIG. 6C is a cutaway view schematic diagram of a horizontally-oriented fully-draining diaphragm pump and check valve assembly in accordance with some embodiments of the present disclosure.

FIGS. 6A, 6B, and 6C illustrate the use of horizontally-oriented fully-draining check valve 500 in a horizontally-oriented fully-draining diaphragm pump and check valve assembly 600. The assembly 600 comprises a diaphragm pump 201 operably connected to a suction manifold 203 and discharge manifold 205. Four horizontally-oriented fully-draining check valves 500A-D are operably connected between each product chamber 211, 213 and each of the suction manifold 203 and discharge manifold 205. Each check valve 500 includes a drain line disposed at the lowest point of the valve body, such that fluid in the valve body flows into the drain line when check valve 500 is shut. Each drain line is operably connected to a ball valve 123A-D which normally remain shut during pumping operations of the assembly 600.

Each product chamber 211, 213 is further configured with a product chamber drain line 227, 229 which is operably connected to a ball valve 601, 602. Product chamber drain lines 227, 229 are connected at the lowest point of the respective product chamber 211, 213 to ensure fluid drains from the respective product chamber 211, 213 when the diaphragm pump 201 is secured and ball valve 601, 602 is open. Ball valves 601, 602 are shut during normal pumping operations.

The present disclosure thus offers many advantages over the prior art. The disclosed fully-draining diaphragm pump, fully-draining check valve, and fully-draining diaphragm pump and check valve assembly can be used during the movement of a wide variety of fluids, including consumer products in a liquid or gel state such as various food, beverage, cosmetic, and pharmaceutical products. The present disclosure provides an apparatus and system which prevents mixing between fluids which are sequentially introduced into a diaphragm pump or check valve. The present disclosure additionally eliminates the time- and labor-intensive task of breaking down equipment for cleaning, since a method is provided which ensures thorough cleaning and removes all fluid from the disclosed apparatus and system. The present disclosure further reduces or eliminates the chances of bacterial growth in the apparatus or system by providing a means to remove all fluid product and cleansing fluid from the apparatus or system.

It will be appreciated by one of skill in the art that although the fully-draining check valve is here disclosed in use with a diaphragm pump, the check valve is also suitable for use in various other systems and configurations, including but not limited to in combination with a centrifugal pump. It will further be appreciated that the fully-draining diaphragm pump and the fully-draining diaphragm pump and check valve assembly disclosed herein are suitable for a wide range of pumping uses which are not limited to consumer products in a fluid state. Indeed, the present disclosure is suitable for application to pumping of nearly any fluid medium.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A fully-draining diaphragm pump and check valve system, comprising:
   a sealed diaphragm pump having a first product chamber on a first side of the pump and a second product chamber on a second side of the pump, which takes fluid by suction from a suction manifold and discharges fluid to a discharge manifold;
   a first check valve disposed between the suction manifold and the first product chamber;
   a second check valve disposed between the suction manifold and the second product chamber;
   a third check valve disposed between the first product chamber and the discharge manifold;
   a fourth check valve disposed between the second product chamber and the discharge manifold, wherein each of the first, second, third, and fourth check valves comprises a mushroom assembly having a stem and valve disc, the valve disc having a back surface that tapers continuously from the stem to a lateral edge, and each of the first, second, third, and fourth check valves having a check valve drain line that is disposed such that an opening in of the respective check valve drain line makes direct contact with the respective valve disc such that fluid at the tapered back surface flows to the check valve drain line.

2. The system of claim 1 wherein each of the valve discs have a rounded front edge.

3. The system of claim 2, wherein each of the first, second, third, and fourth check valves further comprises a valve body, comprising a disc seat and a valve housing having an inlet plenum and outlet plenum, wherein each of the mushroom assemblies is disposed within the respective valve body and biased to seal against the respective disc seat until a predetermined pressure level is achieved in the inlet plenum or a predetermined suction level is achieved in the outlet plenum.

4. The system of claim 3, wherein each of the first, second, third, and fourth check valves further comprises a mushroom assembly guide configured to guide the movement of the respective mushroom assembly when the respective mushroom assembly moves between open and shut positions.

5. The system of claim 4, further comprising a ball valve connected to the respective check valve drain line of each of the first, second, third, and fourth check valves.

6. The system of claim 4, wherein the diaphragm pump includes a product chamber drain line at a low point of the first and second product chambers.

7. The system of claim 6, wherein the product chamber drain lines from each product chamber drain to a respective portion of manifold piping.

8. A diaphragm pump assembly comprising:
a diaphragm pump configured to take fluid by suction from a suction manifold and discharge fluid to a discharge manifold, the diaphragm pump having a product chamber in intermittent fluid communication with each of the suction manifold and the discharge manifold; and
a check valve disposed between the product chamber and one of the suction manifold and the discharge manifold, the check valve comprising a mushroom assembly having a stem and a valve disc having a tapered back edge back surface that tapers continuously from the stem to a lateral edge, wherein a check valve drain line is disposed such that an opening in of the check valve drain line makes direct contact with the valve disc such that fluid at the tapered back surface flows to the check valve drain line.

9. The diaphragm pump assembly of claim 8 wherein the check valve further comprises a valve body having an inlet plenum and an outlet plenum, and wherein when the check valve is in a shut position the valve disc of the mushroom assembly is disposed between the inlet plenum and the outlet plenum.

10. The diaphragm pump assembly of claim 9 wherein the valve body defines a disc seat, and wherein when the check valve is in the shut position the valve disc is seated against the disc seat.

11. The diaphragm pump assembly of claim 10 wherein the check valve is disposed between the product chamber and the suction manifold and wherein the valve disc is configured to seal against the disc seat until a predetermined pressure level is achieved in the inlet plenum or a predetermined suction level is achieved in the outlet plenum.

12. The diaphragm pump assembly of claim 11 wherein the valve disc has a rounded front edge.

13. The diaphragm pump assembly of claim 12 further comprising a ball valve connected to the check valve drain line.

14. The diaphragm pump assembly of claim 13 further comprising a tri-clamp disposed across the outlet plenum of the valve body.

15. The diaphragm pump assembly of claim 14 further comprising a mushroom assembly guide configured to guide the movement of the mushroom assembly when the mushroom assembly moves between open and shut positions.

16. The diaphragm pump assembly of claim 10 wherein the check valve is disposed between the product chamber and the discharge manifold and wherein the valve disc is configured to seal against the disc seat until a predetermined pressure level is achieved in the inlet plenum or a predetermined suction level is achieved in the outlet plenum.

17. The diaphragm pump assembly of claim 16 wherein the valve disc has a rounded front edge.

18. A diaphragm pump assembly comprising:
a diaphragm pump configured to take fluid by suction from a suction manifold and discharge fluid to a discharge manifold, the diaphragm pump having a product chamber in intermittent fluid communication with each of the suction manifold and the discharge manifold, wherein the product chamber defines a low point;
a check valve disposed between the product chamber and one of the suction manifold and the discharge manifold, the check valve comprising a mushroom assembly having a stem and a valve disc having a back surface that tapers continuously from the stem to a lateral edge, wherein a check valve drain line is disposed such that an opening in the check valve drain line makes direct contact with the valve disc such that fluid at the tapered back surface flows to the check valve drain line; and
a product chamber drain line coupled to the product chamber at the low point such that when the diaphragm pump is secured, fluid drains through the product chamber drain line.

19. The diaphragm pump assembly of claim 18 further comprising a valve in the product chamber drain line.

20. The diaphragm pump assembly of claim 19 wherein the valve disc has a rounded front edge.

* * * * *